(Model.) 5 Sheets—Sheet 2.

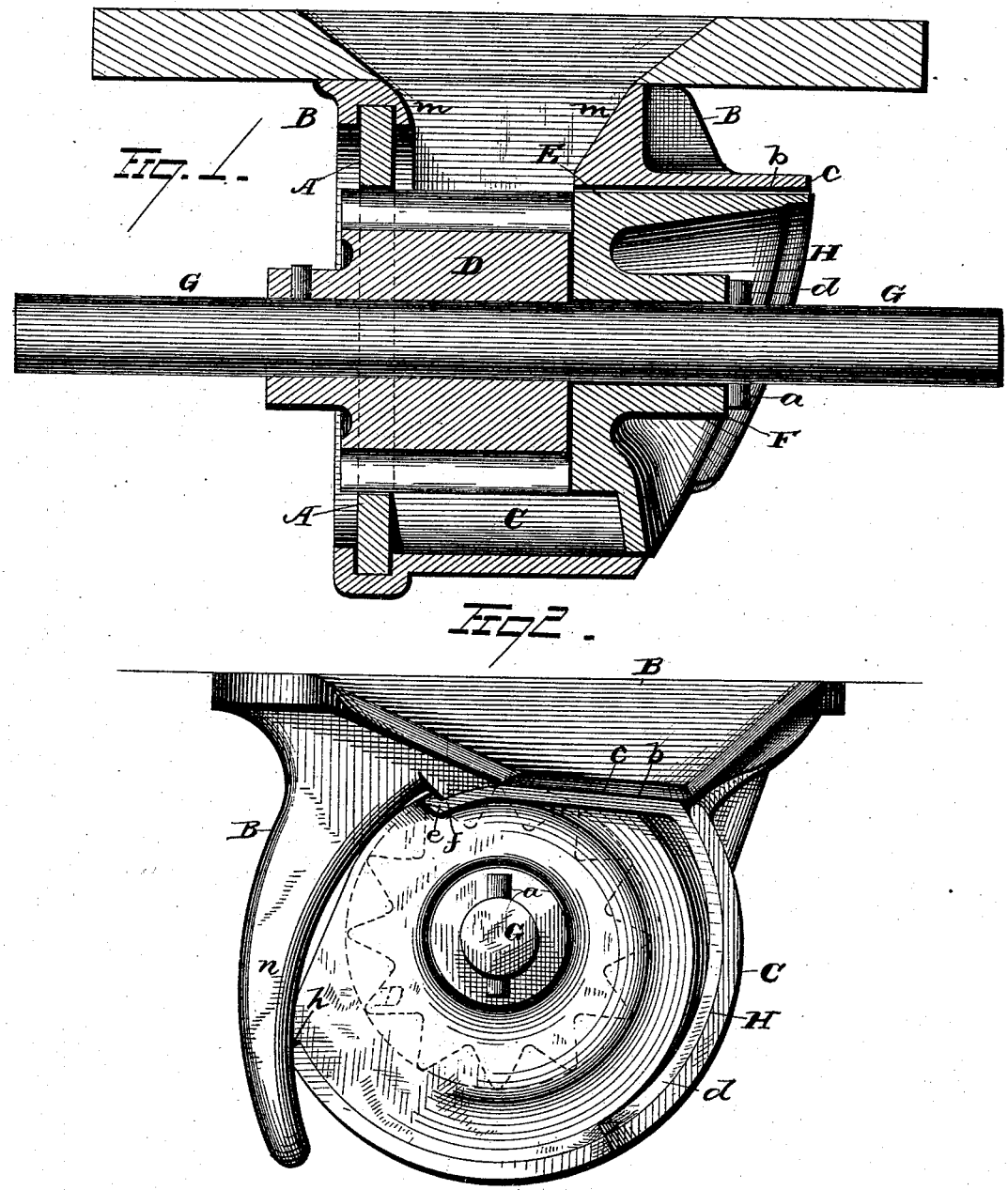

N. A. WHEELER.
Force Feed Seeding Machine.

No. 238,820. Patented March 15, 1881.

WITNESSES
E. Nottingham
Albert L. Lawrence.

INVENTOR
N. A. Wheeler.
By H. A. Seymour
ATTORNEY (Model.) 5 Sheets—Sheet 3.
N. A. WHEELER.
Force Feed Seeding Machine.
No. 238,820. Patented March 15, 1881.
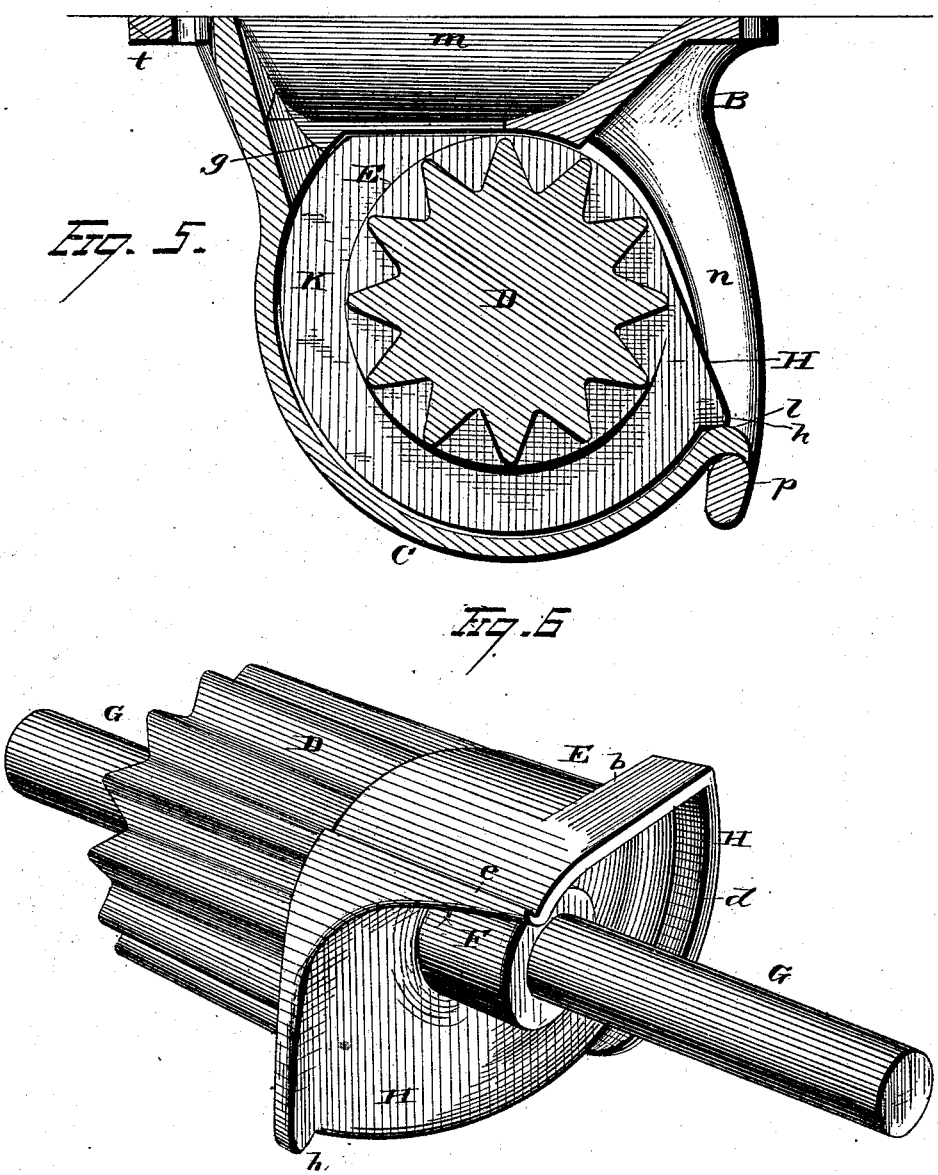
WITNESSES
INVENTOR (Model.)
N. A. WHEELER.
Force Feed Seeding Machine.
No. 238,820. Patented March 15, 1881.
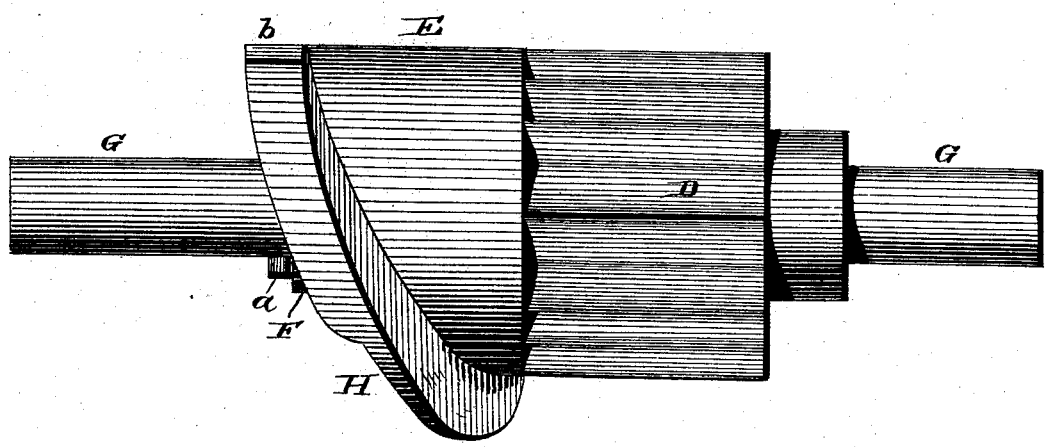
WITNESSES
INVENTOR
ATTORNEY

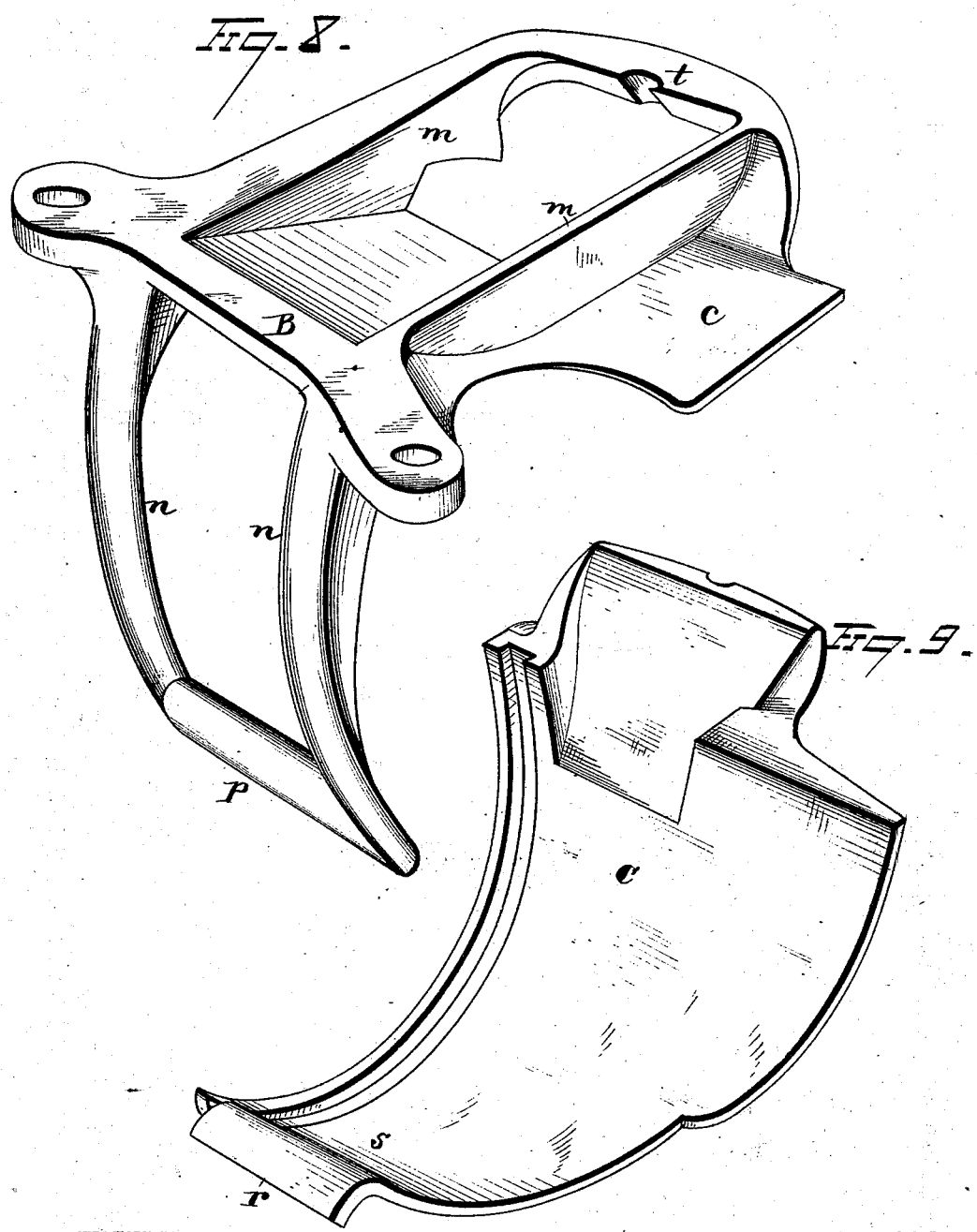

UNITED STATES PATENT OFFICE.

NELSON A. WHEELER, OF JANESVILLE, WISCONSIN, ASSIGNOR TO JAMES B. CROSBY, OF SAME PLACE.

FORCE-FEED SEEDING-MACHINE.

SPECIFICATION forming part of Letters Patent No. 238,820, dated March 15, 1881.

Application filed November 27, 1880. (Model.)

*To all whom it may concern:*

Be it known that I, NELSON AMSBURY WHEELER, of Janesville, in the county of Rock and State of Wisconsin, have invented certain new and useful Improvements in Force-Feed Seeding-Machines; and I do hereby declare the following to be a full, clear, and exact description of the invention, such as will enable others skilled in the art to which it pertains to make and use it, reference being had to the accompanying drawings, which form part of this specification.

This invention has relation to force-feeds in which the entire feed-wheel and its shaft are moved longitudinally to adjust the feed.

It consists, partly, in the combination, with said parts, of a cup having one end movable in the main part of said cup and sleeved on said shaft, so as to move endwise with the latter.

It also consists in suitable guiding and limiting devices for preventing the rotary motion of said movable end, while allowing it to accompany said shaft in the longitudinal movement of the latter.

It also consists in certain other peculiarities of construction, hereinafter more particularly set forth and claimed.

Figure 3:
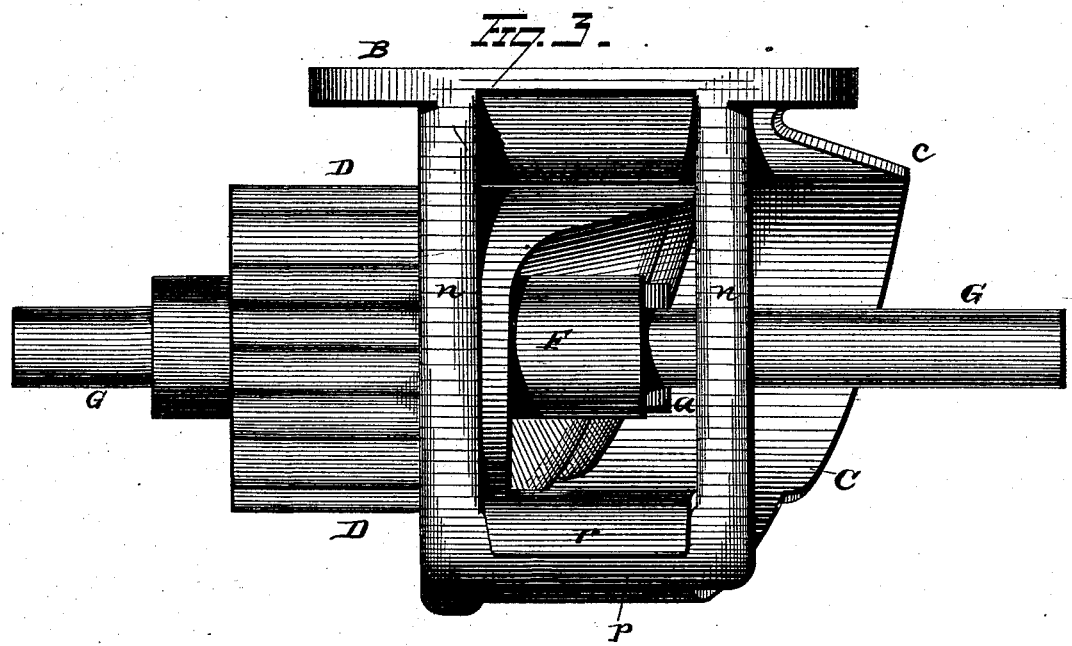
Figure 4:
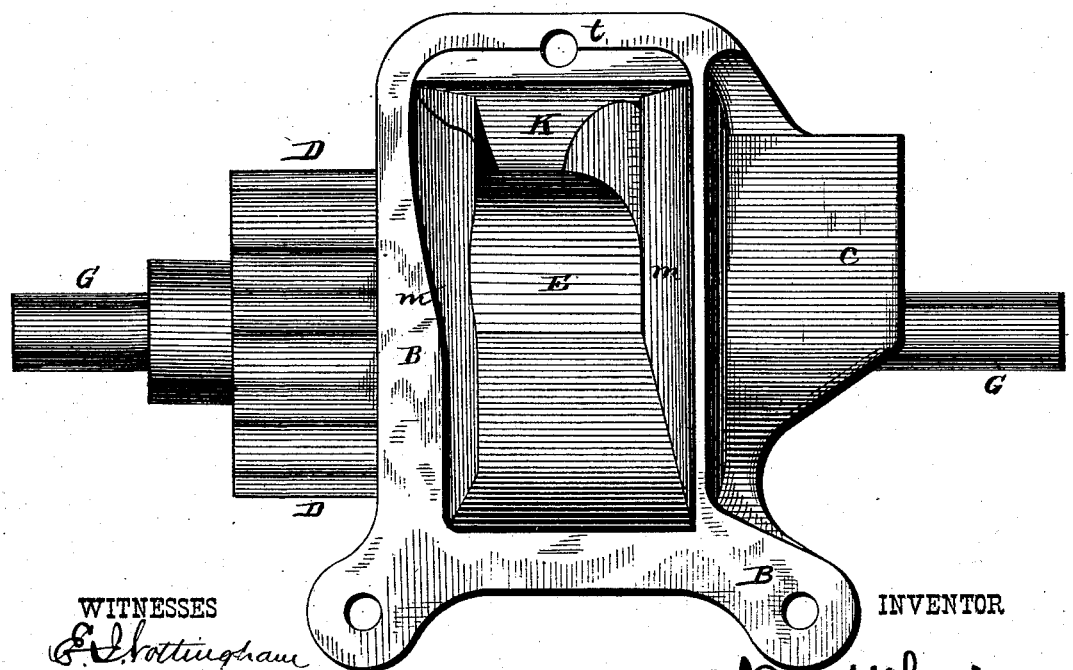

Figure 1 is a vertical longitudinal section of the seed-cup and contained parts. Fig. 2 is an elevation of the movable end of the cup. Fig. 3 is a rear elevation of the cup. Fig. 4 is a plan of the cup, the feed-wheel being moved out of the cup its entire length. Fig. 5 is a vertical transverse section of the cup in a plane passing through the feed-wheel, and looking toward the movable end of the cup. Fig. 6 is a detail perspective of the feed-wheel and the movable end of the cup. Fig. 7 is a detail front elevation of the movable end of the cup and the feed-wheel. Fig. 8 is a detail perspective of the section of the cup having the top and rear side pieces. Fig. 9 is a detail perspective of the section of the cup having the front and bottom plate.

One end of the seed-cup is provided with a rotary disk, A, fitted in grooves formed in the two independent sections B and C, the inner periphery of the disk being notched to fit about the ribbed feed-wheel D as the latter slides in and out of the cup. The end of the cup opposite to the rotary disk is formed independent of the remaining portion of the cup. It consists of a sleeve, E, provided with a journal-box, F, in which the wheel-shaft G has bearing, said sleeve being formed with a radially-projecting flange, H. A pin, *a*, or other suitable device prevents the wheel-shaft from moving endwise without carrying with it the sleeve.

The flange which serves to narrow or widen the seed-passage K of the cup curves toward the wheel from the upper forward portion of the sleeve to the lower rear portion. The top of the flange is made with a lateral extension, *b*, which constitutes a flat bearing against the under side of the plate *c*, the latter being formed on the outer side of the appropriate top side piece of section B. The forward edge of the flange is provided with a lateral extension, *d*, which forms a bearing against the inner side of the front plate of section C.

The rear portion of the top of the sleeve is formed with a transverse rib, *e*, projecting upward and fitting against a corresponding shoulder, *f*, formed on the under side of section B. The upper extremity of the flange H fits against the inner side of a transverse rib, *g*, depending from the forward portion of plate *c*. By these means the seed is effectually cut off from escaping at the upper portion of the sleeve, both the front and rear being guarded by close joints. The upper and forward portions of the sleeve are formed in lateral projection, respectively, above and in front of the journal-box. The lower extremity of the flange H is provided with a shoulder, *h*, which has sliding bearing on the lower horizontal wall, *l*, of the discharge-opening. These several shoulders and ribs formed on the sleeve and flange, and their connecting parts, prevent escapement of the seed, and thus serve as cut-offs. They also serve as guides to maintain the movable end of the cup in position and insure it in true travel as it is laterally moved. As the shaft rotates the wheel, the movable end is maintained in a stationary position; but when the shaft moves the wheel laterally to adjust the feed, the sleeve with its radial flange is carried with the shaft. The flange thus increases or decreases the width of the seed-passage in the cup simultaneously with the adjustment of the feed.

The section B of the cup is provided with two top side pieces, *m*, and two rear side pieces, *n*. The lower ends of the latter are provided with a cross-bar, *p*, over which fits a transverse lip, *r*, formed on the rear extremity of the plate *s*. This plate, which constitutes the front and bottom of section C of the seed-cup, has its forward extremity fitted in a corresponding space formed between the side pieces, *m*, and the cross-bar *t*, which unites their forward extremities. In this manner the cup is formed of independent sections, readily made and easily connected or disconnected.

It is evident that the movable end of the cup may be employed with cups not made with the above-described sections.

Having fully described my invention, what I claim as new, and desire to secure by Letters Patent, is—

1. In a force-feed, the combination, with a seed-cup and a feed-wheel, said wheel being in one piece and movable endwise as a whole, of a cup end formed independent of the main portion of the cup and adapted to have lateral sliding movement within the latter, substantially as set forth.

2. In a force-feed, the combination, with a seed-cup and a feed-wheel having uniform diameter, of a cup end mounted on the wheel-shaft, and adapted to move with the latter as it is longitudinally adjusted, substantially as set forth.

3. In a force-feed, the combination, with a seed-cup and a feed-wheel, said wheel being in one piece, movable endwise as a whole, of a sleeve journaled on the wheel-shaft and adapted to form one end of the seed-cup, said sleeve being movable with the wheel-shaft as the latter is longitudinally adjusted, substantially as set forth.

4. In a force-feed, the combination, with a seed-cup and a feed-wheel, of a sleeve journaled on the wheel-shaft, said sleeve being movable with said shaft as the latter is longitudinally adjusted, and provided with a radially-projecting flange, said flange extending from the upper to the lower portion of the sleeve, substantially as set forth.

5. In a force-feed, the combination, with a seed-cup and a feed-wheel, said wheel being in one piece, of a sleeve journaled on the wheel-shaft, and having its outer end provided with a flange which projects radially from the sleeve, substantially as set forth.

6. In a force-feed, the combination, with a seed-cup and a feed-wheel, of a sleeve journaled on the wheel-shaft, and having its outer end provided with a radially-projecting flange, said flange curving toward the wheel from the upper portion of the sleeve to its lower portion, said sleeve being movable with said shaft as the latter is adjusted longitudinally, substantially as set forth.

7. In a force-feed, the combination, with a seed-cup and a feed-wheel, of a sleeve journaled on the wheel-shaft, and having a flange on its outer end which curves toward the wheel from the upper forward portion of the sleeve to its lower rear portion, said sleeve having bearing within the interior of the cup, which prevents it from turning and permits it to have lateral movement with the wheel, substantially as set forth.

8. In a force-feed, the combination, with a seed-cup and a feed-wheel, of a sleeve journaled on the wheel-shaft, and having a radially-projecting flange on its outer end, which curves toward the wheel from the upper forward portion of the sleeve to the lower rear portion, said sleeve having bearing within the interior of the cup, which prevents it from turning and permits it to have lateral movement, and the cup being formed with a transverse depending rib, against which the upper extremity of said curved flange fits, substantially as set forth.

9. In a force-feed, the combination, with a seed-cup and a feed-wheel, of a sleeve journaled on the wheel-shaft, said sleeve moving with said shaft as the latter is longitudinally adjusted, and having a radially-projecting flange on its outer end, which curves toward the wheel from the upper forward portion of the sleeve to its lower rear portion, the upper rear portion of the sleeve being provided with a transverse rib projecting upwardly and fitting against the corresponding portion of the cup, substantially as set forth.

10. In a force-feed, the combination, with a seed-cup and a feed-wheel, of a sleeve journaled on the wheel-shaft, said sleeve moving with said shaft as the latter is longitudinally adjusted, and having a radially-projecting flange on its outer end, which curves toward the wheel from the upper forward portion of the sleeve to its lower rear portion, the lower extremity of said curved flange being provided with a shoulder, which has sliding bearing on the lower horizontal wall of the discharge-opening, substantially as set forth.

11. In a force-feed, the combination, with a seed-cup and a feed-wheel, of a sleeve journaled on the wheel-shaft, said sleeve moving with said shaft as the latter is longitudinally adjusted, and provided with a radially-projecting flange, which curves toward the wheel from the upper forward portion of the sleeve to its lower rear portion, the top of said flange being practically in line with the top of the sleeve, and forming a flat bearing for the latter against the corresponding portion of the interior of the cup, substantially as set forth.

12. In a force-feed, the combination, with a seed-cup and a feed-wheel, of a sleeve journaled on the wheel-shaft, said sleeve moving with said shaft as the latter is longitudinally adjusted, and provided with a radially-projecting flange, which constitutes the appropriate end of the cup, the upper and forward portions of the sleeve being formed in lateral projection, respectively, over and in front of its journal-box, substantially as set forth.

13. In a force-feed, the combination, with a seed-cup and feed-wheel, of a sleeve journaled on the wheel-shaft, said sleeve moving with said shaft as the latter is longitudinally adjusted, and provided with a radially-projecting flange, which curves toward the wheel from the upper forward portion of the sleeve to its lower rear portion, the top of said flange and its forward edge being provided with a lateral extension, which forms an extended bearing against the interior of the cup, substantially as set forth.

In testimony that I claim the foregoing I have hereunto set my hand this 10th day of November, 1880.

NELSON AMSBURY WHEELER.

Witnesses:
J. B. ROWLEY,
OTTO O. WILD.